(12) United States Patent
Willis et al.

(10) Patent No.: US 7,166,679 B2
(45) Date of Patent: Jan. 23, 2007

(54) CONJUGATED DIENE POLYMERS AND COPOLYMER BLOCKS HAVING HIGH VINYL CONTENT PREPARED USING MIXED MICROSTRUCTURE CONTROL AGENTS AND PROCESS FOR PREPARING SAME

(75) Inventors: Carl L. Willis, Houston, TX (US); David K. Schisla, Pleasant Prairie, WI (US); Daniel E. Goodwin, Katy, TX (US)

(73) Assignee: Kraton Polymers LLC, Houston, TX (US)

( * ) Notice: Subject to any disclaimer, the term of this patent is extended or adjusted under 35 U.S.C. 154(b) by 0 days.

(21) Appl. No.: 10/946,878

(22) Filed: Sep. 22, 2004

(65) Prior Publication Data

US 2005/0065287 A1   Mar. 24, 2005

Related U.S. Application Data

(60) Provisional application No. 60/505,637, filed on Sep. 24, 2003.

(51) Int. Cl.
*C08L 53/00*   (2006.01)

(52) U.S. Cl. ..................................... 525/271
(58) Field of Classification Search ................ 525/271
See application file for complete search history.

(56) References Cited

U.S. PATENT DOCUMENTS

| | | | |
|---|---|---|---|
| 3,113,986 A | 12/1963 | Breslow et al. | |
| 3,130,237 A | 4/1964 | Wald | |
| 3,205,218 A | 9/1965 | Arbuckle et al. | |
| 3,595,942 A | 7/1971 | Wald et al. | |
| 3,855,189 A | 12/1974 | Farrar et al. | |
| 3,965,080 A | 6/1976 | Hargis et al. | |
| 3,966,638 A | 6/1976 | Hargis et al. | |
| 4,012,336 A | 3/1977 | Hargis et al. | |
| 4,139,690 A | 2/1979 | Torigoe et al. | |
| 4,172,100 A | 10/1979 | Tung et al. | |
| 4,182,818 A | 1/1980 | Tung et al. | |
| 4,196,153 A | 4/1980 | Tung et al. | |
| 4,196,154 A | 4/1980 | Tung et al. | |
| 4,918,142 A * | 4/1990 | Saito et al. | .......... 525/99 |
| 5,212,249 A | 5/1993 | Richie et al. | |
| 5,447,995 A | 9/1995 | Hoxmeier et al. | |
| 5,691,420 A | 11/1997 | Leffelaar et al. | |
| 5,693,718 A | 12/1997 | De Groot et al. | |
| 5,750,055 A | 5/1998 | Van Der Steen et al. | |
| 5,777,043 A | 7/1998 | Shafer et al. | |
| 5,795,944 A | 8/1998 | Graafland et al. | |
| 5,814,709 A | 9/1998 | De Boer et al. | |
| 5,886,107 A | 3/1999 | De Boer et al. | |
| 5,910,546 A * | 6/1999 | Trepka et al. | .......... 525/314 |
| 5,925,707 A | 7/1999 | Shafer et al. | |
| 5,925,717 A | 7/1999 | De Boer et al. | |
| 6,127,444 A | 10/2000 | Kadri | |
| 6,187,873 B1 | 2/2001 | Handlin, Jr. et al. | |
| H1956 H | 4/2001 | Schisla et al. | |
| 6,455,651 B1 | 9/2002 | Willis et al. | |
| 6,461,993 B1 | 10/2002 | Van Der Heijden et al. | |
| 6,465,557 B1 | 10/2002 | De Keyzer et al. | |
| 6,508,875 B1 | 1/2003 | Bodt et al. | |

FOREIGN PATENT DOCUMENTS

| | | |
|---|---|---|
| EP | 0 796 872 A2 | 9/1997 |
| WO | 2004/058840 A1 | 7/2004 |

* cited by examiner

*Primary Examiner*—Jeffrey Mullis
(74) *Attorney, Agent, or Firm*—Donna Blalock Holguin

(57) ABSTRACT

Disclosed is a process for preparing polymers and copolymer blocks of conjugated dienes with high amounts of branching, commonly referred to as vinyl content, comprising the use of at least two microstructure control agents. One of the microstructure control agents can be a bulk microstructure control agents such as diethyl ether. The other microstructure control agent is a specific microstructure control agent such as 1,2-diethoxypropane. The use of a bulk and a specific microstructure control agent together can allow for the production of high levels of vinyl content at high polymerization rates without the undesirable affects experienced with either one alone.

22 Claims, No Drawings

CONJUGATED DIENE POLYMERS AND COPOLYMER BLOCKS HAVING HIGH VINYL CONTENT PREPARED USING MIXED MICROSTRUCTURE CONTROL AGENTS AND PROCESS FOR PREPARING SAME

CROSS-REFERENCE TO RELATED APPLICATION

The present application claims priority from commonly assigned U.S. provisional patent application Ser. No. 60/505,637, filed Sep. 24, 2003, entitled Anionic Polymerization Diinitiator and Process for Preparing Same.

BACKGROUND OF THE INVENTION

1. Field of the Invention

The present invention relates to conjugated diene polymers and conjugated diene copolymer blocks, and a process for preparing them. The present invention particularly relates to butadiene and styrenic block copolymers and a process for preparing them.

2. Background of the Art

The preparation of conjugated diene polymers, particularly in the form of block copolymers is well known. In a synthetic process, an initiator compound is used to start the polymerization of one monomer. The reaction is allowed to proceed until all of the monomer is consumed resulting in a living homopolymer. To this living homopolymer is added a second monomer that is chemically different from the first. The living end of the first polymer serves as the site for continued polymerization, thereby incorporating the second monomer as a distinct block into the linear polymer. The block polymer so grown is living until terminated.

Butadiene and styrene are often used to prepare such polymers. The most common of these are styrene and butadiene diblock copolymers and triblock copolymers having a butadiene based midblock with styrene endblocks. In some instances, coupling agents can also be used to couple still living polymers to prepare higher molecular weight polymers. In the production of the most common triblock copolymers, after the butadiene midblock is prepared, additional styrene is then added to the molecule to form a styrene endblock. These polymers are often referred to as SBS copolymers. Such polymers are often sold with retained unsaturation, but hydrogenated forms wherein some or all of the unsaturation has been eliminated are also known.

Microstructure control of conjugated diene polymers or conjugated diene copolymer blocks within block copolymers can be important because a controlled degree of branching in the polymer can be desirable. In the case of butadiene, if the polybutadiene or polybutadiene block is all straight chain, such as in 1,4-polybutadiene, then when the polymer is hydrogenated it will have a polyethylene-like structure and have the corresponding crystallinity associated with such a structure. If the polybutadiene or polybutadiene block is branched, such as in 1,2-polybutadiene, the crystallinity will be lessened or eliminated, which can introduce thermoplastic and elastomeric properties into the polymer.

The glass transition temperature (Tg) of conjugated diene polymers is also affected by microstructure control. The more 1,4-polybutadiene structure present, the lower the resulting Tg of the butadiene segments and the lower the service temperatures of the polymer. Microstructure can also affect melt compatibility with polyolefins such as polypropylene and polyethylene.

It is sometimes desirable that the microstructure of the block copolymer includes at least some degree of branching or vinyl content in the polybutadiene midblocks. The resulting block copolymers can then have the desired thermoplastic and elastomeric properties, such as lower glass transition temperature and hardness. Methods for control of microstructure in the anionic polymerization of dienes are known in the art and disclosed in references such as U.S. Pat. No. 5,795,944 to Graafland, et al. Therein, it is disclosed to use a microstructure control agent in two or more doses to closely control the vinyl content of a polymer, in some cases even varying the vinyl content within different regions within the diene block.

SUMMARY OF THE INVENTION

In one aspect, the present invention is a process for preparing a conjugated diene polymer or copolymer block comprising combining: (a) an anionic polymerization site; (b) a conjugated diene monomer; and (c) at least two microstructure control agents; under reaction conditions sufficient to form a living polymer admixture wherein at least one of the at least two microstructure control agents is a bulk microstructure control agent and at least one of the at least two microstructure control agents is a specific microstructure control agent.

In another aspect, the present invention is a polymer or copolymer block prepared using a process for preparing a conjugated diene polymer or copolymer block comprising combining: (a) an anionic polymerization site; (b) a conjugated diene monomer; and (c) at least two microstructure control agents; under reaction conditions sufficient to form a living polymer admixture wherein at least one of the at least two microstructure control agents is a bulk microstructure control agent and at least one of the at least two microstructure control agents is a specific microstructure control agent.

DETAILED DESCRIPTION OF THE PREFERRED EMBODIMENTS

The present invention is, in a preferred embodiment, a conjugated diene polymer or conjugated diene copolymer block. The conjugated diene polymers or copolymer blocks of the present invention can be linear or radial and prepared with or without coupling agents. In a preferred embodiment, the invention is a copolymer block such as in a styrene-butadiene-styrene copolymer wherein the butadiene midblock is prepared using the process of the present invention. The invention includes both hydrogenated and unhydrogenated forms.

While the present invention includes conjugated diene polymers, a preferred embodiment is a copolymer having a conjugated diene polymer of the present invention as a block incorporated within the block copolymer. The linear form of the block copolymers of the present invention have a general formula AB wherein B is a copolymer block prepared using a conjugated diene and the process of the present invention. A is a block prepared using a different monomer such as, for example, styrene. When preparing copolymers, it is often common to prepare the copolymer having the general structure ABA.

The radial form of the block copolymers of the present invention have a general formula $(AB)_nX$. For example when the block copolymer is prepared from a vinyl aromatic monomer and a conjugated diene monomer, A stands for a vinyl aromatic copolymer block; B stands for a conjugated diene copolymer block; X stands for the residue of a coupling agent; and n is more than 1, preferably from 2 to 40, more preferably from 2 to 5, most preferably from 2 to 4. Radial forms of the block copolymers of the present invention can also have a general formula $(ABA)_nX$ and also $(BAB)_nX$.

The block copolymers of the present invention may have a tapered block structure. In tapered block copolymers, each block should contain predominantly only one component, A or B. In each block, the presence of the non-predominant or minor component is preferably less than 50 weight percent, more preferably less than 20 weight percent. Most preferably each block contains only one or essentially only one component, i.e. A or B.

The conjugated diene polymers or block copolymers of the present invention are prepared using solution anionic polymerization techniques. Using this process, the polymer or block copolymers of the present invention are prepared by contacting the monomer or monomers to be polymerized simultaneously or sequentially with an anionic polymerization initiator such as group IA metals, their alkyls, amides, silanolates, naphthalides, biphenyls or anthracenyl derivatives. It is preferred to use an organo alkali metal (such as lithium or sodium or potassium) compound in a suitable solvent at a temperature within the range from about 10° C. to about 150° C., preferably at a temperature within the range from about 30° C. to about 120° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4. The organolithium initiators are preferred for polymerization at higher temperatures because of their increased stability at elevated temperatures.

While the monofunctional initiators are preferred for use with the present invention, other multifunctional initiators, particularly as minor amounts in admixture with monofunctional initiators can be used. There are many multifunctional initiators that can be used herein. The di-sec-butyl lithium adduct of m-diisopropenyl benzene is preferred because of the relatively low cost of the reagents involved and the relative ease of preparation. Diphenylethylene, styrene, butadiene, and isoprene will all work to form dilithium (or disodium) initiators upon contact with the zero valence metal. Still another compound that will form a di-initiator and will work in the process of the present invention is the adduct derived from the reaction of 1,3-bis(1-phenylethenyl) benzene (DDPE) with two equivalents of a lithium alkyl.

Related adducts which are also known to give effective dilithium initiators are derived from the 1,4-isomer of DDPE. In a similar way, it is known to make analogs of the DDPE species having alkyl substituents on the aromatic rings to enhance solubility of the lithium adducts. Related families of products which also make good dilithium initiators are derived from bis[4-(1-phenylethenyl)phenyl]ether, 4,4'-bis(1-phenylethenyl)-1,1'-biphenyl, and 2,2'-bis[4-(1-phenylethenyl)phenyl]propane. For example, see L. H. Tung and G. Y. S. Lo, Macromolecules, 1994, 27, 1680–1684 (1994) and U.S. Pat. Nos. 4,172,100, 4,196,154, 4,182,818, and 4,196,153. Suitable lithium alkyls for making these dilithium initiators include the commercially available reagents, such as sec-butyl and n-butyl lithium, as well as anionic prepolymers of these reagents, polystyryl lithium, polybutadienyl lithium, polyisopreneyl lithium, and the like.

Conjugated dienes that are useful with the present invention and which can be polymerized anionically include those conjugated diolefins containing from 4 to about 12 carbon atoms such as 1,3-butadiene, isoprene, piperylene, methylpentadiene, 1,3-cyclohexadiene, 1,3-cycloheptadiene, 1,3-cyclooctadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, α-methyl styrene, 2-vinyl pyridine, 4-vinyl pyridine, vinyl naphthalene, alkyl-substituted vinyl naphthalenes and the like. Mixtures of these may be used. Preferably, the conjugated diene is 1,3-butadiene.

When the present invention is a conjugated diene polymer, the conjugated diene monomer is contacted with the anionic polymerization initiator to first form an anionic polymerization site. Polymerization occurs at this site as it comes into contact with additional monomer molecules. If the present invention is a block copolymer and the first blocks prepared are the conjugated diene copolymer blocks, then the living polymer serves as the site for continued polymerization.

When the present invention is a block polymer, but the conjugated diene copolymer blocks are not the first blocks formed, a first monomer, different from the conjugated diene monomer or monomers is polymerized as set out above, and this block serves as the anionic polymerization site for the continued polymerization incorporating the conjugated diene monomers as a distinct block into the linear polymer. In any of these embodiments, the block copolymer so grown is living until terminated.

The polymerization of the process of the present invention is carried out, preferably at a temperature of 30° C. to 120° C. in a hydrocarbon solvent. Suitable solvents include straight and branched chain hydrocarbons such as pentane, hexane, heptane, octane and the like, as well as alkyl-substituted derivatives thereof; cycloaliphatic hydrocarbons such as cyclopentane, cyclohexane, cycloheptane and the like, as well as alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; and mixtures thereof.

In the practice of the process of the present invention for polymerizing a conjugated diene, at a point in the process prior to the completion of the addition of the conjugated diene monomer to a living polymer chain, a microstructure control agent is added to the living polymer admixture. The desired level of vinyl content is achieved by properly selecting the type and the amount of these microstructure control agents, which are commonly Lewis basic compounds.

For the purposes of the present application, the microstructure control agents can be divided into two categories. A first category comprises compounds selected from monooxygenated ethers including, but not limited to, diethyl ether, dimethyl ether, dibutyl ether, methyl ethyl ether, and mixtures thereof. These compounds, while functioning as microstructure control agents, must be present in comparatively large quantities to effectively modify the vinyl content of a polymer or polymer block. For example, a microstructure control agent of this category is typically used in concentration of from at least 10 to as much as 100 times the molar concentration of the living polymer chain ends. This category of microstructure control agents is, for the purposes of the present invention, the bulk microstructure control agent group.

The second category of microstructure control agents comprises those selected from polyoxygenated ethers effective in forming chelated complexes with Li⁺ including but not limited to, 1,2-diethoxyethane
1,2-diethoxypropane
o-dimethoxybenzene
1-t-butoxy-2-n-butoxyethane,
n-C₄H₉OCH₂CH₂O-n-C₄H₉, and mixtures thereof. Also included in this group are crown ethers having more than one oxygen atom in close proximity. These stronger microstructure control agents can be used in smaller amounts than bulk modifiers, typically from about 10 to about 1000 parts per million or about equal to or less than one equivalent per equivalent of active chain ends in a polymer cement. This category of microstructure control agents is, for the purposes of the present invention, the specific microstructure control agent group.

In the practice of the present invention, a diene polymer or diene polymer block is prepared using at least two microstructure control agents wherein at least one of the at least two microstructure control agents is a bulk microstructure control agent and at least one of the at least two microstructure control agents is a specific microstructure control agent. The bulk microstructure control agent is present in the polymerization solution in a concentration of from about 0.1 to about 10 weight percent, preferable from about 1 to about 10 weight percent, and most preferably from about 1 to about 6 weight percent. The specific microstructure control agent is present in a concentration of from about 1 to about 1000 parts per million, preferable from about 10 to about 1000 parts per million, and most preferably about 50 parts per million. The microstructure control agents may be split equally between the different doses of the agents which are added to the polymerization mix or varying amounts may be added at various points as required or they may be added continuously.

The present invention represents an advance over the conventional practices of using either a bulk microstructure control agent or a specific microstructure control agent alone. A disadvantage of the bulk microstructure control agents is that they are comparatively ineffective at producing higher vinyl content and must be used in large quantities. The use of such large quantities requires their recovery from the polymer and, at least economically, their recycle. The specific microstructure control agents are very effective in low concentrations at producing high vinyl content, but in themselves cause poor initiation when the stoichiometry of the control agent to the initiating species is less than 1, accelerated thermal die out, and too fast polymerization rates. All of these can impact polymer quality and increase production costs, results usually very undesirable in a production process.

It has been observed that the use of a combination of both a bulk and a specific microstructure control agent can overcome the undesirable properties of the individual microstructure control agents. This synergistic combination can be used to produce polymers or polymer blocks having desirably high vinyl content and at the same time avoiding most or all of the higher production costs and quality problems associated with the use of either microstructure control agent alone.

When the combination of microstructure control agents of the present invention is used in the amounts indicated above in a polymerization process such as that of the present invention, the resulting polymer or copolymer block can have substantially more branching than the polymer or copolymer block would have if prepared in the absence of the microstructure control agent. For example, when butadiene is used in an anionic polymerization process without a microstructure control agent, the amount of branching observed is usually from about 5 to about 10 percent of the monomer units. The percent branching represents the portion of the polymer or copolymer block that has the general formula (showing the product of the polymerization of two butadiene units):

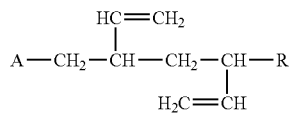

wherein A is a copolymer block or hydrogen and R is an anionic polymerization site, a copolymer block, or hydrogen. This structure represents the reaction product of two 1,2-additions. As the pendant olefin groups in this structure have what is sometimes termed a vinyl substitution pattern, the terms 1,2-addition and vinyl addition are commonly used interchangeably in describing this kind of butadiene polymerization. In the absence of a microstructure control agent, the predominantly unbranched polymer or copolymer block has a general structure:

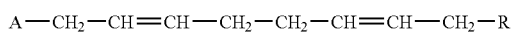

wherein A is a copolymer block or hydrogen and R is an anionic polymerization site, a copolymer block, or hydrogen. This structure represents the product of a 1,4-addition for two butadiene units. This second conformation is substantially less branched and, when hydrogenated more crystalline than the first while the first structure is more elastomeric when hydrogenated.

In a preferred embodiment, the present invention is a block copolymer prepared using a conjugated diene and preferably a vinyl aromatic compound. Suitable vinyl aromatic compounds useful with the process of the present invention include those having from 8 to 20 carbon atoms and include styrene, o-methylstyrene, p-methylstyrene, p-tert-butylstyrene, 2,4-dimethylstyrene, α-methylstyrene, vinylnaphthalene, vinyltoluene, vinylxylene, 1,1-diphenylethylene, and mixtures thereof. Preferred monovinyl aromatic compounds are styrene, alpha-methylstyrene and para-methylstyrene, styrene being the most preferred. For the purposes of the present invention, a styrenic block copolymer is any block copolymer polymer prepared with a suitable vinyl aromatic compound.

The process of the present invention, while especially useful for preparing styrenic block copolymers, can be used to prepare any form of block copolymer known to be useful to those of ordinary skill in the art of preparing such block copolymers. For example, the conjugated dienes can be polymerized with a non-styrenic second monomer. The use of more than a single conjugated diene monomer to produce a block copolymer having more than a single type of block derived from a conjugated diene is also within the scope of the present invention.

The block copolymers of the present invention can be diblocks, triblocks, or even prepared having 3 or more distinct types of blocks with the copolymer. They can be prepared using coupling agents or not. The molecular weight will vary with the intended use of the block copolymer. For example, when coupled, the total average molecular weight of the coupled styrenic block copolymer of the present invention is preferably within the range of from about 20,000 to about 300,000 daltons More preferably, the number average molecular weight is from about 30,000 to about 150,000 daltons, and most preferably, from about 30,000 to 100,000 daltons.

The number average molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of other (block) polymers is expressed as styrene equivalent molecular weight. Optionally, the styrene equivalent molecular weight may be converted to true molecular weight when the styrene content of the polymer and the vinyl content of the diene segments are known. The detector used is preferably a combination ultraviolet and refractive index detector.

The block copolymers of the present invention can be used in any application wherein such polymers are useful. For example, the block copolymers of the present invention are particularly useful as additives for bitumens in road and roofing use and as adhesives and additives for adhesives. They can be used alone and in combination with other polymers such as polyethylene, polypropylene, and polystyrene for the production of molded and extruded products such as footwear and film wraps. The polymers of the present invention can also be foamed to produced low density products.

The presence of olefinic double bonds in polymers makes them susceptible to oxygen attack and to deterioration by actinic radiation; saturation of olefinic double bonds greatly improves environmental stability and may improve color. Therefore, after preparation, the branched polymers and block copolymers of the present invention can be hydrogenated. Such hydrogenation can be accomplished using any of the processes known by those of ordinary skill in the art to be useful. For example, U.S. Pat. No. 3,130,237, suggests hydrogenating unsaturated compounds by the use of certain cobalt complexes. U.S. Pat. No. 3,205,218 teaches hydrogenation of olefinic compounds utilizing a complex of a nickel or cobalt compound with certain aluminum reactants. U.S. Pat. No. 3,113,986 is related and suggests hydrogenation in the presence of the reaction products of certain metal alkoxides with aluminum trialkyls. U.S. Pat. No. 3,595,942 teaches selective hydrogenation of block copolymers with reaction products of aluminum trialkyls and metal alkoxides or carboxylates. The hydrogenation will preferably be a selective hydrogenation wherein aromatic unsaturation is not hydrogenated.

The polymers of the present invention may also, optionally, contain various additives, such as antioxidants, ultraviolet absorbers, light stabilizers or coloring agents. Preferably the amount of these additives present in the polymer composition is not more than 5 weight parts per 100 weight parts of block copolymer.

EXAMPLES

The following examples are provided to illustrate the present invention. The examples are not intended to limit the scope of the present invention and they should not be so interpreted. Amounts are in weight parts or weight percentages unless otherwise indicated.

Example 1

Cyclohexane (1775 grams (g)) was charged into a 1 gallon (3.8 liter (L)) stainless steel autoclave equipped with a water circulation jacket. Butadiene (100 g); 1,2-diethoxypropane (0.121 g in 12 g of cyclohexane); and diethyl ether (120 g) were then charged to the autoclave and the temperature maintained at about 40° C. Sec-butyl lithium (5.8 g of an 11 weight percent solution in cyclohexane) was then added to the autoclave. The temperature of the autoclave was maintained at about 40° C. for 180 minutes. Methanol (4 milliliters (ml)) was added at the end of the polymerization period to terminate the polymerization. A sample of the resultant polymer had a vinyl content as determined by $^1$H NMR of 48 percent. The pseudo first order rate constant was determined to be 0.055 min.$^{-1}$.

Example 2

The method of Example 1 was repeated in substantially the same manner except that 1,2-diethoxypropane (0.06 g) in cyclohexane (5.94 g) and diethyl ether (121 g) were used. A sample of the resultant polymer had a vinyl content as determined by $^1$H NMR of 41 percent. The pseudo first order rate constant was determined to be 0.056 min.$^{-1}$.

Comparative Example 1

The method of Example 1 was repeated in substantially the same manner except that no 1,2-diethoxypropane or diethyl ether was used. A sample of the resultant polymer had a vinyl content as determined by $^1$H NMR of 14 percent. The pseudo first order rate constant was determined to be 0.011 min.$^{-1}$.

Comparative Example 2

The method of Example 1 was repeated in substantially the same manner except that no diethyl ether was used and 1,2-diethoxypropane (0.06 g) in cyclohexane (5.94 g) was used instead. A sample of the resultant polymer had a vinyl content as determined by $^1$H NMR of 31 percent. The pseudo first order rate constant was determined to be 0.019 min.$^{-1}$.

Comparative Example 3

The method of Example 1 was repeated in substantially the same manner except that no diethyl ether was used and 1,2-diethoxypropane (0.121 g) in cyclohexane (12 g) was used instead. A sample of the resultant polymer had a vinyl content as determined by $^1$H NMR of 47 percent. The pseudo first order rate constant was determined to be 0.023 min.$^{-1}$.

Comparative Example 4

The method of Example 1 was repeated in substantially the same manner except that no 1,2-diethoxypropane was used and diethyl ether (120.5 g) was used instead. A sample of the resultant polymer had a vinyl content as determined by $^1$H NMR of 39 percent. The pseudo first order rate constant was determined to be 0.047 min.$^{-1}$.

As can be seen from the test results, the use of two categories of microstructure control agent together resulted in higher levels of vinyl content than either material would have produced alone. In addition, the polymers were produced at a faster rate thus minimizing thermal termination problems.

What is claimed is:

1. A process for preparing a conjugated diene polymer or copolymer block comprising combining: (a) an anionic polymerization site; (b) a conjugated diene monomer; and (c) at least two microstructure control agents; under reaction conditions sufficient to form a living polymer admixture wherein at least one of the at least two microstructure control agents is a monooxygenated acyclic ether and at least one of the at least two microstructure control agents is a polyoxygenated ether effective in forming chelated complexes with Li$^+$ and wherein the at least two microstructure control agents are added simultaneously.

2. The process of claim 1 wherein the monooxygenated ether is selected from diethyl ether, dimethyl ether, dibutyl ether, methyl ethyl ether and mixtures thereof.

3. The process of claim 3 wherein the monooxygenated ether is diethyl ether.

4. The process of claim 1 wherein the polyoxygenated ether effective in forming chelated complexes with Li$^+$ is selected from 1,2-diethoxyethane, 1,2-diethoxypropane, o-dimethoxybenzene, 1-t-butoxy-2-n-butoxyethane, n-C$_4$H$_9$OCH$_2$CH$_2$O-n-C$_4$H$_9$, crown ethers having more than one oxygen atom in close proximity and mixtures thereof.

5. The process of claim 1 wherein the conjugated diene monomer is selected from the group, 1,3-butadiene, isoprene, piperylene, methylpentadiene, 1,3-cyclohexadiene, 1,3-cycloheptadiene, 1,3-cyclooctadiene phenylbutadiene, 3,4-dimethyl-1,3-hexadiene, 4,5-diethyl-1,3-octadiene, and mixtures thereof.

6. The process of claim 5 wherein the conjugated diene monomer is 1,3-butadiene.

7. The process of claim 1 wherein the monooxygenated acyclic ether is present in a concentration from about 0.1 to about 10 weight percent and the polyoxygenated ether effective in forming chelated complexes with Li$^+$ is present in a concentration from about 1 to about 1000 parts per million.

8. The process of claim 1 wherein the process is for preparing a conjugated diene copolymer and the anionic polymerization site is a living polymer.

9. The process of claim 8 additionally comprising a step of preparing the anionic polymerization site by admixing a monomer different from the conjugated diene monomer with an initiator.

10. The process of claim 9 wherein the monomer different from the conjugated diene monomer is styrene.

11. The process of claim 10 wherein the polyoxygenated ether effective in forming chelated complexes with Li+ is 1,2-diethoxypropane.

12. The process of claim 11 further comprising using a coupling agent to form a coupled block copolymer.

13. The polymer or block copolymer of claim 1 wherein the polymer or block copolymer is a copolymer.

14. The copolymer of claim 13 wherein the copolymer has a general formula AB wherein B is a copolymer block prepared using a conjugated diene and A is a block prepared using a different monomer.

15. The copolymer of claim 14 wherein A is styrene.

16. The copolymer of claim 15 additionally comprising a second A block resulting in a general structure of ABA.

17. The copolymer of claim 13 wherein the copolymer is a copolymer having a general formula (AB)$_n$X wherein A is a vinyl aromatic copolymer block; B is a conjugated diene copolymer block; X is the residue of a coupling agent; and n is from 2 to 40.

18. The copolymer of claim 13 wherein the copolymer is a copolymer having a general formula (ABA)$_n$X wherein A is a vinyl aromatic copolymer block; B is a conjugated diene copolymer block; X is the residue of a coupling agent; and n is from 2 to 40.

19. The copolymer of claim 13 wherein the copolymer is a copolymer having a general formula (BAB)$_n$X wherein A is a vinyl aromatic copolymer block; B is a conjugated diene copolymer block; X is the residue of a coupling agent; and n is from 2 to 40.

20. The process of claim 1 wherein the monooxygenated ether is diethyl ether and the polyoxygenated ether effective in forming chelated complexes with Li$^+$ is 1,2-diethoxypropane.

21. The process of claim 4 wherein the polyoxygenated ether effective in forming chelated complexes with Li$^+$ is o-dimethoxybenzene.

22. The process of claim 4 wherein the polyoxygenated ether effective in forming chelated complexes with Li$^+$ is 1,2-diethoxypropane.

* * * * *